United States Patent
Buckus et al.

(10) Patent No.: US 9,302,785 B2
(45) Date of Patent: Apr. 5, 2016

(54) ENGINE INSTALLATION USING MACHINE VISION FOR ALIGNMENT

(75) Inventors: Gary M. Buckus, Bothell, WA (US); Michael John Tanzini, Hamilton, NJ (US)

(73) Assignee: The Boeing Company, Chicago, IL (US)

(*) Notice: Subject to any disclaimer, the term of this patent is extended or adjusted under 35 U.S.C. 154(b) by 2580 days.

(21) Appl. No.: 11/947,767

(22) Filed: Nov. 29, 2007

(65) Prior Publication Data
US 2009/0139072 A1 Jun. 4, 2009

(51) Int. Cl.
*B64F 5/00* (2006.01)

(52) U.S. Cl.
CPC ......... *B64F 5/0009* (2013.01); *Y10T 29/49895* (2015.01); *Y10T 29/53974* (2015.01)

(58) Field of Classification Search
USPC ................ 29/889.2, 428, 464, 465, 466, 468, 29/281.4, 467
See application file for complete search history.

(56) References Cited

U.S. PATENT DOCUMENTS

| | | | | |
|---|---|---|---|---|
| 4,890,918 | A * | 1/1990 | Monford | 356/150 |
| 6,485,247 | B1 * | 11/2002 | Groves et al. | 414/589 |
| 7,103,952 | B2 | 9/2006 | Appleton et al. | |
| 2003/0090682 | A1 * | 5/2003 | Gooch et al. | 356/620 |

OTHER PUBLICATIONS

Machine Vision Guidance for Automated Assembly, http://ranier.hq.nasa.gov/telerobotics_page/Technologies/0225.html (May, 1996).

* cited by examiner

*Primary Examiner* — Christopher Besler
(74) *Attorney, Agent, or Firm* — Miller, Matthias & Hull LLP

(57) ABSTRACT

Installation of an engine to a support structure includes temporarily attaching first and second alignment structures to the support structure and the engine. One of the alignment structures has a target pattern on its surface. The installation further includes using a machine vision system from the other of the mounting structures to indicate the relative position of the target pattern with respect to a reference. The relative position of the target pattern with respect to the reference provides information about relative position of an engine mounting element (e.g., bolt hole) with respect to a corresponding mounting element (e.g., bolt hole) in the support structure. The relative position of the target pattern with respect to the reference can be used to maneuver the engine in order to align the mounting elements.

33 Claims, 3 Drawing Sheets

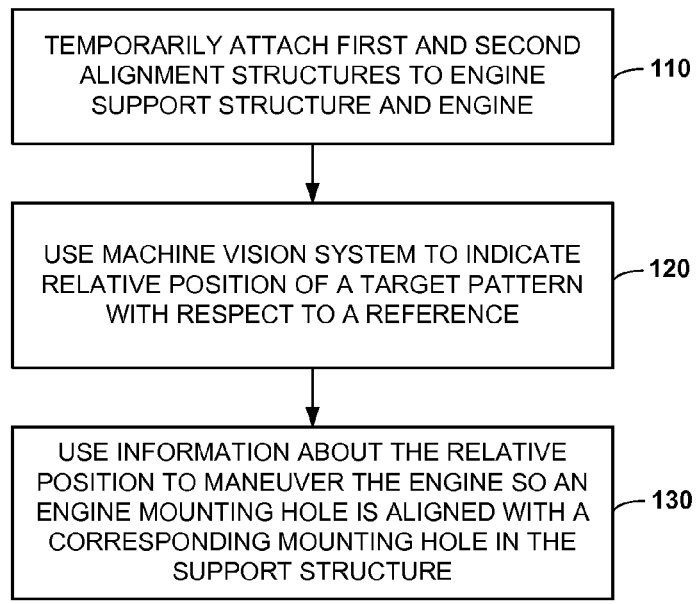
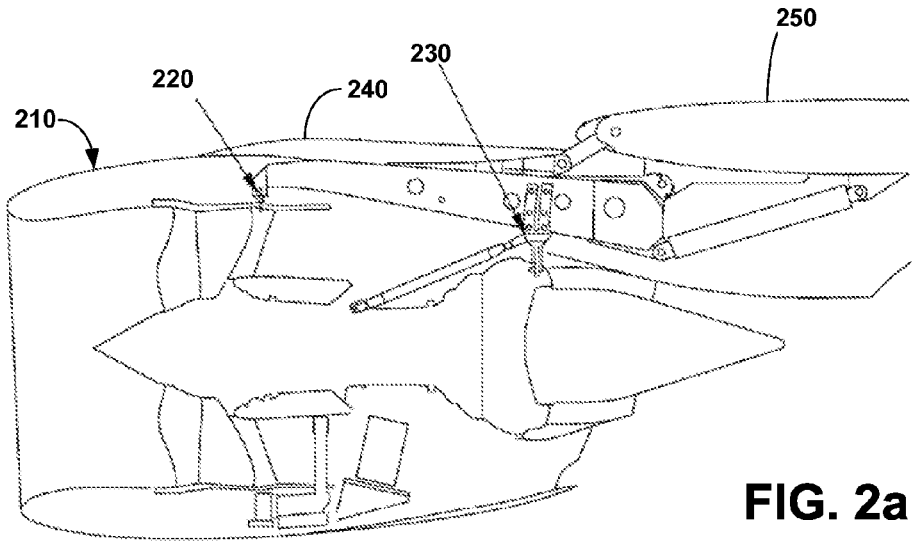

ENGINE INSTALLATION USING MACHINE VISION FOR ALIGNMENT

BACKGROUND

The Boeing 787 Dreamliner™ airplane has two high bypass turbofan engines, one under each wing. The engines are very large. Each engine has a length of about 160 inches and a fan diameter of about 110 inches.

The engines are mounted to pylons on the wings. During installation of an engine, the engine is moved toward a pylon and maneuvered so mounting holes in its mounts are aligned with mounting holes in the pylon. With the mounting holes aligned, shear pins are engaged in the engine mounts. Once the shear pins are at full engagement, the engine is moved into its final position and fastened to the pylon with tension bolts.

Maneuvering the engine with respect to the pylon is challenging, especially while lining up the mounting holes for the shear pins. Because the engine is so large and because the mounting holes are at the top of the engine, visual sight lines to the mounting holes are poor.

SUMMARY

According to an aspect of the present invention, installation of an engine to a support structure includes temporarily attaching first and second alignment structures to the support structure and the engine. One of the alignment structures has a target pattern on its surface. The installation further includes using a machine vision system from the other of the mounting structures to indicate the relative position of the target pattern with respect to a reference. The relative position of the target pattern with respect to the reference provides information about relative position of an engine mounting element (e.g., a bolt hole) with respect to a corresponding mounting element (e.g., a bolt hole) of the support structure. The relative position of the target pattern with respect to the reference can be used to maneuver the engine in order to align the mounting elements.

BRIEF DESCRIPTION OF THE DRAWINGS

FIG. 1 is an illustration of a method in accordance with an embodiment of the present invention.

FIG. 2a is an illustration of an aircraft engine mounted to a pylon.

DETAILED DESCRIPTION

Figure 2B:
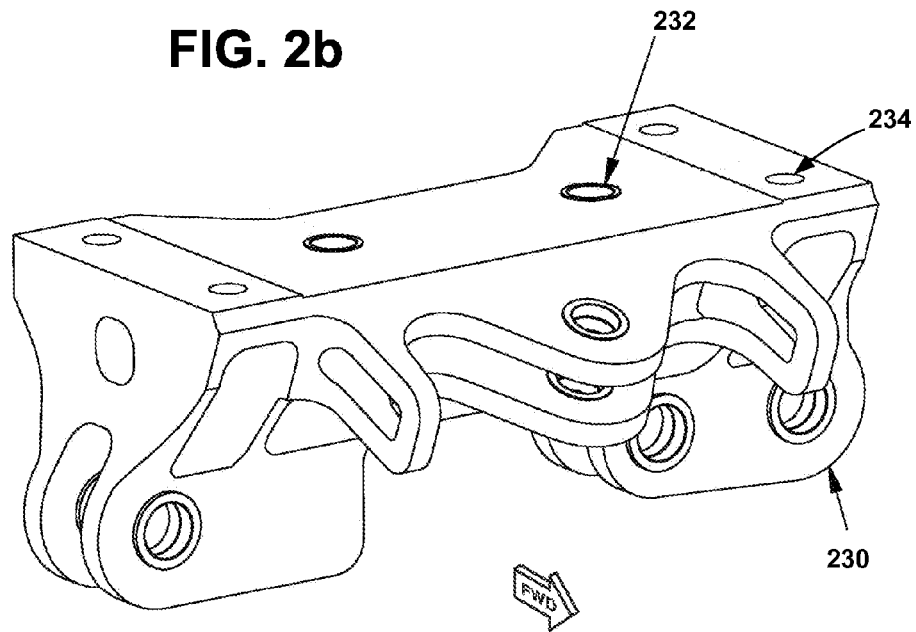
FIG. 2b is an illustration of an aft engine mount.

Reference is made to FIG. 1, which illustrates a method of aligning a mounting hole of an engine with a corresponding mounting hole of a support structure. By aligning the mounting holes, a pin, bolt or other fastener can be inserted through the aligned holes so the engine can be secured to the support structure.

At block 110, a first alignment structure (e.g., a plate) is temporarily attached to the support structure. Components (e.g., a camera) of a machine vision system are already mounted on the first alignment structure. The first alignment structure is attached to a known location on the support structure. This allows the machine vision system to establish a reference with respect to a known location on the support structure.

Also at block 110, a second alignment structure (e.g., a plate) is temporarily attached to the engine. The second alignment structure may be attached indirectly (e.g., through an engine mount) or directly to the engine. The second alignment structure has a target pattern on a portion of its surface. This surface portion will hereinafter be referred to as the "imaging surface." The target pattern may include one or more points, lines, shapes, etc. The target pattern may be painted, etched, printed, silk-screened or otherwise placed on the imaging surface. The target pattern may even be natural feature (e.g., grains) of the imaging surface.

The second alignment structure is attached to a known location on the engine. This places the target pattern at a known location with respect to the engine.

A relative position of the target pattern with respect to the reference can be observed. This relative position provides information about relative position of an engine mounting hole with respect to a corresponding mounting hole in the support structure (since the locations of the reference and the target pattern are known on the support structure and the engine).

At block 120, the machine vision system is used to indicate relative position of the target pattern with respect to the reference. In some embodiments, the machine vision system performs pattern recognition on the target pattern, acquiring the target pattern and computing distance and direction of the target pattern from the reference.

In other embodiments, the machine vision system projects the reference onto the imaging surface of the second alignment structure. For example, the machine vision system projects laser lines onto the imaging surface of the second mounting structure. The machine vision system also creates real-time images of the imaging surface. The images indicate the relative position of the target pattern with respect to the reference (and, therefore, the relative position of the engine mounting hole with respect to the corresponding mounting hole in the support structure). The machine vision can also process the images to compute distance and direction of the target pattern from the reference.

At block 130, the information about the relative position of the target pattern with respect to the reference is used to maneuver the engine in order to align the mounting holes. For example, the real-time images are displayed to those people maneuvering the engine. In addition to providing the real-time images, the machine vision system can compute distance/direction commands and make such information available to those people maneuvering the engine.

The engine is continually maneuvered until the target pattern coincides with or overlaps the reference or reaches some other desired position with respect to the reference (the target pattern and reference do not necessarily have to overlap). Once the target pattern and reference are aligned, the mounting holes are aligned, and the engine is in position to be secured to the support structure.

In some embodiments, the first alignment structure (temporarily attached to the support structure) may have the imaging surface (including the target pattern), and the second alignment structure (temporarily attached to the engine) may carry the machine vision components.

The alignment structures may be used to align more than one mounting hole at the same time. An example of aligning multiple holes simultaneously is described below.

The mounting holes are not limited to any particular types of holes. For instance, the mounting holes may be tension bolt holes, shear pin holes, etc.

Moreover, a method according to an embodiment of the present invention is not limited to the alignment of mounting holes. Other types of mounting elements, such as protrusions (e.g., shear pins), may be aligned with corresponding mounting elements.

A method according to an embodiment of the present invention is not limited to any particular type of engine. However, the method is especially useful for installing large aircraft engines and other large engines where sight lines to mounting holes are poor.

Reference is made to FIG. 2a, which illustrates an aircraft engine 210 with forward and aft mounts 220 and 230. The forward and aft mounts 220 and 230 are attached to a pylon 240, which is beneath a wing 250.

Additional reference is made to FIG. 2b, which illustrates an exemplary aft mount 230. The aft mount 230 includes shear pin holes 232 and tension bolt holes 234. The aft mount 230 may be attached to the engine 210 using spherical-type ball joints, which are designed to allow the engine 210 to move a little during installation.

Figure 3:
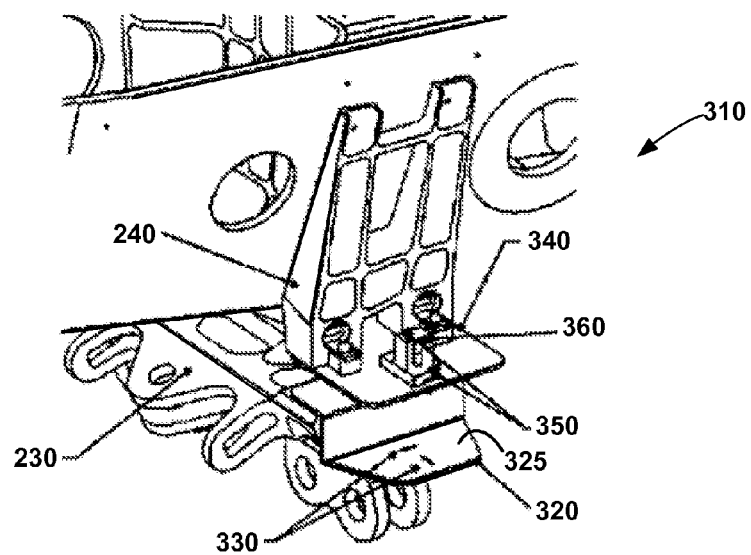
FIG. 3 is an illustration of apparatus in accordance with an embodiment of the present invention.

Reference is made to FIG. 3, which illustrates apparatus 310 for aligning mounting holes of an aircraft engine with mounting holes of a pylon 240. In FIG. 3, only the aft mount 230 of the engine is shown. The engine is not shown for clarity.

The apparatus 310 includes a lower alignment plate 320 having a target pattern 330 on an imaging surface 325. The apparatus 310 further includes an upper alignment plate 340 that carries two line-projecting lasers 350 and a camera 360. The alignment plates are shaped to avoid interferences with surrounding structure, yet provide a clear line of sight from components 350 and 360 to the imaging surface 325.

The upper alignment plate 340 has shallow indexing pins (not shown) that can fit into the mounting holes of the pylon 240. The lower alignment plate 320 has shallow indexing pins (not shown) that can fit into the mounting holes of the aft engine mount 230.

The lower alignment plate 320 allows the target pattern to be indexed to the mounting holes in the engine. By attaching to the engine mounting holes, the exact spatial relation of the target with respect to the engine mounting holes is known.

The upper alignment plate 340 allows a reference line to be indexed to the mounting holes in the pylon 240. For example, the reference line is formed by a laser line, or by the line of sight of the camera. By attaching to the pylon mounting holes, the exact spatial relation of the reference line to the pylon mounting holes is known.

The alignment of the reference line with the target pattern 330 can be determined on a test/calibration jig, prior to mounting the alignment plates 320 and 340. The plates 320 and 340 can be aligned on the jig (e.g., by aligning the indexing pins of the two plates 320 and 340), and the laser lines can be projected on the imaging surface 325 of the lower plate 320. The target pattern 330 can be placed on the imaging surface 325 at the locations where the laser lines fall on the imaging surface 325.

If the machine vision system performs the alternative approach of pattern recognition, the upper alignment plate 340 will carry the camera 360, but not the line-projecting laser. Alignment of the target pattern 330 and the reference may be determined by aligning the alignment plates 320 and 340 on a test/calibration jig, and using the camera 360 to take a picture of the imaging surface plate of the lower alignment plate 320. Pattern recognition software can use that picture as the target pattern.

Figure 4:
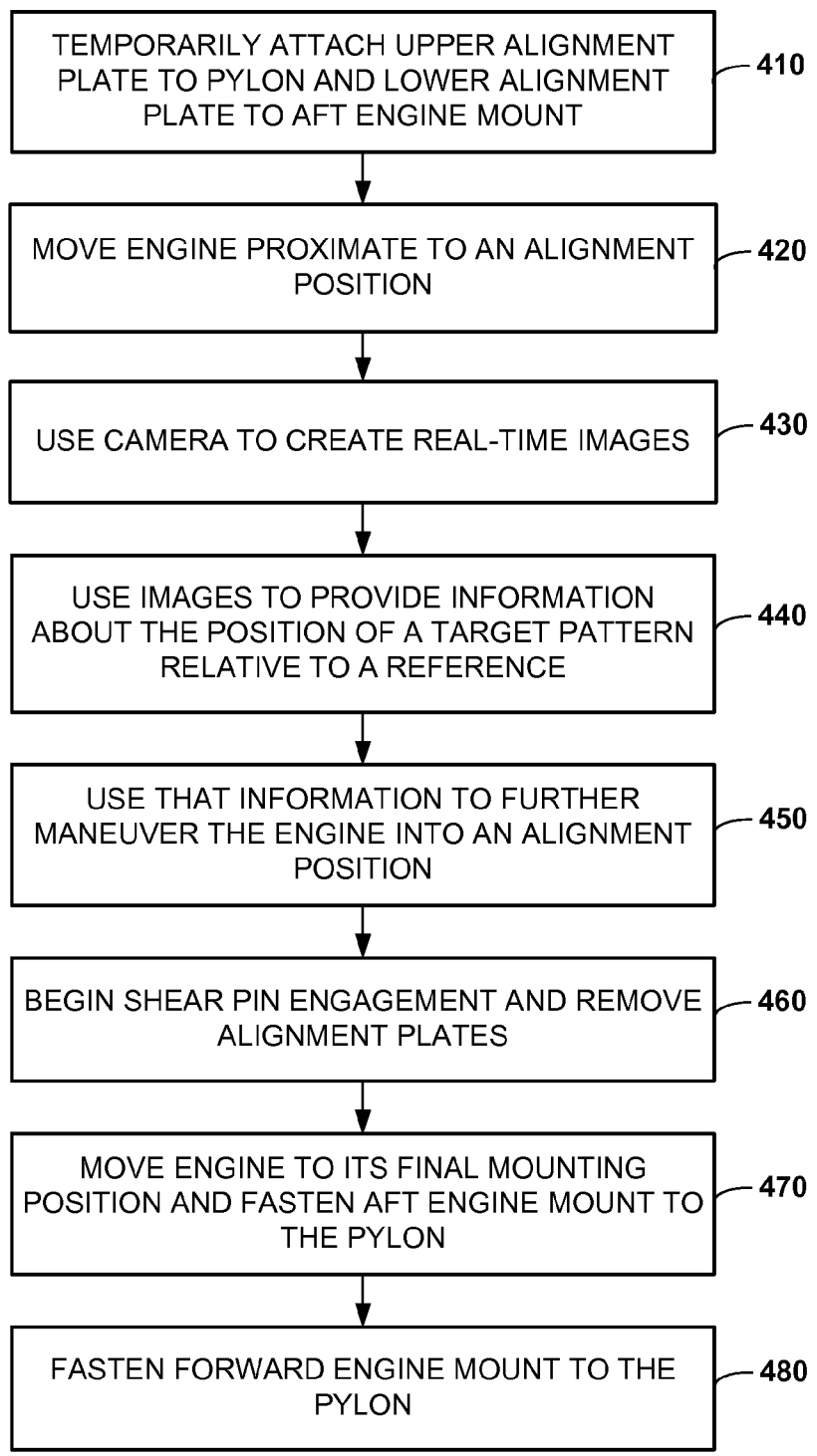
FIG. 4 is an illustration of a method of using the apparatus of FIG. 3 to install an aircraft engine.

Additional reference is made to FIG. 4, which illustrates a method of installing an aircraft engine of a wide body aircraft. At block 410, the upper alignment plate is temporarily attached to the pylon by inserting the shallow indexing pins of the upper alignment plate into tension bolt holes of the pylon. The upper alignment plate may be secured to the pylon using slide block hold-down devices.

Also at block 410, the lower alignment plate is temporarily attached to the engine by inserting the shallow indexing plugs/pins of the lower alignment plate into tension bolt holes of the aft engine mount. These alignment plates will allow shear pins to be partially engaged before the plates are removed. The lower alignment plate may be secured to the aft engine mount using thumbscrew bolts that extend through the lower plate.

At block 420, the engine is moved proximate to an alignment position. For example, the engine may be moved approximately one to two feet away from the alignment position.

The engine may be moved, lifted and subsequently maneuvered by a transporter/loader. An exemplary transporter/loader may include an engine engagement unit (e.g., a pair of coupling assemblies) for engaging an engine, a drive assembly (e.g., a multi-directional drive wheel system) for moving the engine to a desired position on a floor surface, and a lift assembly (e.g., a pair of scissor lift mechanisms) for raising the engine. The engine can be moved and maneuvered with multiple (e.g., six) degrees of freedom. A single operator can control these assemblies from a control station. An exemplary transporter/loader is described in U.S. Pat. No. 7,103,952. A transporter/loader that provides multi-axis positioning of the engine is available from MaxMove Industrier AB of Bjurholm, Sweden.

However, movement, positioning and maneuvering of the engine is not limited to a transporter/loader. For instance, overhead cranes, or mobile lifting devices called "Bootstrap Arms" may be used.

At block 430, the camera begins creating real-time images of the imaging surface. As the engine is being moved toward the alignment position, the lower alignment plate will appear in the images. Then the target pattern will appear.

At block 440, those images are used to provide information about the position of the target pattern relative to the reference. The images may be used by displaying them to the operator in real time. Instead of, or in addition, the images may be processed to generate position/direction commands, which may be displayed to the operator.

At block 450, the operator uses that information to further maneuver the engine into the alignment position. If the operator is viewing real-time images, the operator controls the transporter/loader to maneuver the engine so the target pattern approaches the reference. If commands are displayed to the operator, the operator controls the transporter/loader to maneuver the engine according to those commands.

The operator can change the field of view if additional cameras are mounted to the upper alignment plate. The operator can select different cameras to monitor different aspects of the installation.

At block 460, after the engine has reached its alignment position (e.g., the target pattern coincides with the reference), the engagement of shear pins begins. Both alignment plates are removed once shear pin engagement has begun. The tension bolt holes on the engine mount and pylon are now exposed.

At block 470, after the shear pins have been engaged, the engine is moved to its final mounting position. The engine mount allows for a little movement of the engine as the transporter/loader moves the engine against the pylon. Then the engine is fastened to the pylon with tension bolts.

At block 480, the forward mount of the engine is also fastened to the pylon. There is no need to use the alignment apparatus on both engine mounts if the mounting holes of the forward engine mount are already lined up with corresponding holes in the pylon.

In some embodiments, the engine can be maneuvered into its final position hands-free, without the interaction of a human operator. The control station may include a closed loop control that receives positional feedback from the machine vision system. In response to the feedback, the closed loop control commands the transporter/loader to maneuver the engine. The method of FIG. 4 may be modified for such closed loop control. Commands are still generated at block 440, but those commands are sent to a closed loop control (instead of being displayed to a human operator) at block 450.

A method according to an embodiment of the present invention helps to streamline the engine installation process. Continual real-time information is available as to the alignment and positioning of an engine relative to a pylon. Installation is faster and allows for more accurate relative positioning of an engine with respect to a pylon.

An operator can remotely view the area of engine interface in real time from a "desired perspective" (e.g., looking straight down), in an area where it is physically impossible for him to see. In addition, the operator can change the field of view of the camera to focus on the area of interest during alignment. These images can be viewed from a convenient location (e.g., at the control station of the transporter/loader).

A single operator can move an engine into alignment, thereby eliminating the need for spotters and, therefore, problems inherent with spotters. Such problems include erroneous communication with the operator (which can result in improper positioning of the engine) and injury to those spotters in the immediate area of the engine-to-pylon interface.

The invention claimed is:

1. A method of installing an engine to a support structure, the method comprising:
   temporarily attaching first and second alignment structures to the support structure and the engine, including engaging mounting holes of the support structure and the engine, one of the alignment structures having a target pattern on its surface;
   using a machine vision system from the other of the alignment structures to indicate the relative position of the target pattern with respect to a reference, wherein the relative position of the target pattern with respect to the reference provides information about relative position of a mounting element of the engine with respect to a corresponding mounting element of the support structure; and
   using the relative position of the target pattern with respect to the reference to maneuver the engine in order to align the mounting elements.

2. A method of installing an engine to a support structure, the method comprising:
   temporarily attaching first and second alignment structures to the support structure and the engine, one of the alignment structures having an imaging surface and a target pattern on the imaging surface;
   using a machine vision system from the other of the alignment structures to indicate the relative position of the target pattern with respect to a reference, including projecting the reference onto the imaging surface, and creating real-time images of the imaging surface, the images indicating the relative position of the target pattern with respect to the reference, wherein the relative position of the target pattern with respect to the reference provides information about relative position of a mounting element of the engine with respect to a corresponding mounting element of the support structure; and
   using the relative position of the target pattern with respect to the reference to maneuver the engine in order to align the mounting elements.

3. The method of claim 2, wherein the machine vision system uses pattern recognition of the imaging surface to indicate the relative position of the target pattern with respect to the reference.

4. A method of installing an engine to a support structure, the method comprising:
   temporarily attaching first and second alignment structures to the support structure and the engine, one of the alignment structures having a target pattern on its surface;
   using a machine vision system from the other of the alignment structures to indicate the relative position of the target pattern with respect to a reference, wherein the relative position of the target pattern with respect to the reference provides information about relative position of a mounting element of the engine with respect to a corresponding mounting element of the support structure;
   using the relative position of the target pattern with respect to the reference to maneuver the engine in order to align the mounting elements; and
   adjusting field of view of the machine vision system.

5. A method of installing an engine to a support structure, the method comprising:
   temporarily attaching first and second alignment structures to the support structure and the engine, one of the alignment structures having a target pattern on its surface;
   using a machine vision system from the other of the alignment structures to indicate the relative position of the target pattern with respect to a reference, including computing real-time information about position and direction of the target pattern from the reference as the engine is being moved towards the support structure, wherein the relative position of the target pattern with respect to the reference provides information about relative position of a mounting element of the engine with respect to a corresponding mounting element of the support structure; and
   using the real-time information to maneuver the engine, including displaying the real-time information to a human operator so the human operator can use a transporter/loader to maneuver the engine in order to align the mounting elements.

6. A method of installing an engine to a support structure, the method comprising:
   temporarily attaching first and second alignment structures to the support structure and the engine, one of the alignment structures having a target pattern on its surface;
   using a machine vision system from the other of the alignment structures to indicate the relative position of the target pattern with respect to a reference, including computing real-time information about position and direction of the target pattern from the reference as the engine is being moved towards the support structure, wherein the relative position of the target pattern with respect to the reference provides information about relative position of a mounting element of the engine with respect to a corresponding mounting element of the support structure; and sending the information to a closed loop control for a transporter/loader, the transporter/loader maneuvering the engine in response to the information in order to align the mounting elements.

7. A method of installing an engine to a support structure, the method comprising:

temporarily attaching first and second alignment structures to the support structure and the engine, one of the alignment structures having a target pattern on its surface;

using a machine vision system from the other of the alignment structures to indicate the relative position of the target pattern with respect to a reference, wherein the relative position of the target pattern with respect to the reference provides information about relative position of a mounting element of the engine with respect to a corresponding mounting element of the support structure; and using the relative position of the target pattern with respect to the reference to maneuver the engine in order to align the mounting elements;

wherein the engine is an aircraft engine of a wide body aircraft, wherein the engine is maneuvered by a loader/transporter that can move, lift and maneuver the engine in multiple axes; and wherein one of an operator and a closed loop control of the transporter/loader uses the information to control the loader in order to maneuver the engine with respect to the support structure.

8. The method of claim 1, wherein the mounting holes are shear pin holes, the method further comprising removing both alignment plates once shear pin engagement has begun.

9. The method of claim 2, wherein the machine vision system stores a picture of the imaging surface at an alignment position, the picture providing the target pattern, and wherein the maneuvering includes performing pattern matching to find the target pattern picture in the images.

10. A method of installing an engine to a support structure including a pylon, the method comprising:

temporarily attaching first and second alignment plates to mounting holes on the pylon and the engine, one of the alignment plates having a target pattern on its surface;

using a machine vision system from the other of the alignment plates to indicate the relative position of the target pattern with respect to a reference, wherein the relative position of the target pattern with respect to the reference provides information about relative position of a mounting element of the engine with respect to a corresponding mounting element of the support structure; and using the relative position of the target pattern with respect to the reference to maneuver the engine in order to align the mounting elements;

wherein the reference is at a known location on the pylon and the target pattern is at a known location with respect to the engine.

11. The method of claim 1, wherein the machine vision system projects the reference onto the surface, and creates real-time images of the surface, and uses pattern recognition of the surface to determine the relative position of the target pattern with respect to the projected reference.

12. The method of claim 1, wherein the machine vision system stores a picture of the surface with the target pattern at an alignment position, and wherein using the relative position includes performing pattern matching to find the picture in the images.

13. The method of claim 1, wherein field of view of the machine vision system is adjusted while using the relative position.

14. The method of claim 1, wherein using the relative position includes displaying real-time information to a human operator so the human operator can use a transporter/loader to maneuver the engine in order to align the mounting elements.

15. The method of claim 1, wherein using the relative position includes sending the relative position to a closed loop control for a transporter/loader, the transporter/loader maneuvering the engine in response to the relative position to align the mounting elements.

16. The method of claim 1, wherein the engine is an aircraft engine of a wide body aircraft, wherein the engine is maneuvered by a loader/transporter that can move, lift and maneuver the engine in multiple axes, and wherein one of an operator and a closed loop control of the transporter/loader uses the relative position to command the loader in order to maneuver the engine.

17. The method of claim 16, wherein the support structure includes a pylon, the engine includes an engine mount, and the first and second alignment structures are first and second plates that are temporarily attached to mounting holes in the pylon and the engine mount.

18. The method of claim 2, wherein field of view of the machine vision system is adjusted while using the relative position to maneuver the engine.

19. The method of claim 2, wherein using the relative position includes displaying real-time information to a human operator so the human operator can use a transporter/loader to maneuver the engine in order to align the mounting elements.

20. The method of claim 2, wherein using the relative position includes sending the relative position to a closed loop control of a transporter/loader, the transporter/loader maneuvering the engine in response to the relative position to align the mounting elements.

21. The method of claim 2, wherein the engine is an aircraft engine of a wide body aircraft, wherein the engine is maneuvered by a loader/transporter that can move, lift and maneuver the engine in multiple axes, and wherein one of an operator and a closed loop control of the transporter/loader uses the relative position to command the loader/transporter to maneuver the engine.

22. The method of claim 4, wherein using the relative position includes displaying real-time information to a human operator so the human operator can use a transporter/loader to maneuver the engine in order to align the mounting elements.

23. The method of claim 4, wherein using the relative position includes sending the relative position to a closed loop control of a transporter/loader, the transporter/loader maneuvering the engine in response to the relative position to align the mounting elements.

24. The method of claim 4, wherein the engine is an aircraft engine of a wide body aircraft, wherein the engine is maneuvered by a loader/transporter that can move, lift and maneuver the engine in multiple axes, and wherein one of an operator and a closed loop control of the transporter/loader uses the relative position to command the loader to maneuver the engine.

25. The method of claim 5, wherein the engine is an aircraft engine of a wide body aircraft, and wherein the engine is maneuvered by a loader/transporter that can move, lift and maneuver the engine in multiple axes.

26. The method of claim 6, wherein the engine is an aircraft engine of a wide body aircraft, and wherein the engine is maneuvered by a loader/transporter that can move, lift and maneuver the engine in multiple axes.

27. The method of claim 7, wherein the machine vision system projects the reference onto the surface, creates real-time images of the surface, and uses pattern recognition of the surface to indicate the relative position of the target pattern with respect to the reference.

28. The method of claim 7, wherein the machine vision system stores a picture of the surface with the target pattern at an alignment position, and wherein using the relative position includes performing pattern matching to find the picture in the images.

29. The method of claim 7, wherein field of view of the machine vision system is adjusted while using the relative position of the target pattern.

30. The method of claim 7, wherein using the relative position includes displaying real-time information to the human operator so the human operator can use the transporter/loader to maneuver the engine.

31. The method of claim 7, wherein using the relative position includes sending the relative position to the closed loop control of the transporter/loader.

32. The method of claim 7, wherein the support structure includes a pylon, and the first and second alignment structures are first and second plates that are temporarily attached to holes in the pylon and the engine.

33. The method of claim 7, wherein the mounting structure includes a pylon, the engine includes an engine mount, the mounting holes are shear pin holes, and the first and second alignment structures are first and second plates, and wherein using the relative position includes:
- aligning the shear pin holes in the engine mount and the pylon;
- removing both plates once shear pin engagement has begun;
- moving the engine to its final mounting position; and
- fastening the engine to the pylon.

* * * * *